United States Patent [19]
Falk

[11] Patent Number: 5,772,324
[45] Date of Patent: *Jun. 30, 1998

[54] PROTECTIVE TUBE FOR MOLTEN METAL IMMERSIBLE THERMOCOUPLE

[75] Inventor: Richard A. Falk, Hartland, Wis.

[73] Assignee: Midwest Instrument Co., Inc., Hartland, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 537,011

[22] Filed: Oct. 2, 1995

[51] Int. Cl.⁶ .............................. G01K 7/04; G01K 1/12
[52] U.S. Cl. ...................... 374/140; 374/179; 136/232; 136/233; 136/234
[58] Field of Search .................................. 374/140, 179; 136/230, 232, 233, 234

[56] References Cited

U.S. PATENT DOCUMENTS

| 2,647,153 | 7/1953 | Guerry | 136/230 |
|---|---|---|---|
| 3,357,250 | 12/1967 | Lowdermilk | 374/140 |
| 3,544,387 | 12/1970 | Norby | 136/233 |
| 4,069,715 | 1/1978 | Falk | 374/140 |
| 4,333,803 | 6/1982 | Seger et al. | |
| 4,721,534 | 1/1988 | Phillippi et al. | 374/179 |
| 4,724,428 | 2/1988 | Brown, Jr. | 136/234 |
| 4,762,571 | 8/1988 | Kaufman et al. | 136/234 |
| 4,805,454 | 2/1989 | LeVert | 136/233 |
| 4,919,543 | 4/1990 | Davis et al. | 374/139 |
| 4,984,904 | 1/1991 | Nakano et al. | 374/139 |
| 4,995,733 | 2/1991 | Thomas et al. | 374/140 |
| 5,037,211 | 8/1991 | Nakashima et al. | 374/139 |
| 5,069,553 | 12/1991 | Phillippi | 374/140 |
| 5,071,258 | 12/1991 | Usher et al. | 136/234 |

FOREIGN PATENT DOCUMENTS

| 1027909 | 4/1958 | Germany | 136/233 |
|---|---|---|---|
| 0055828 | 5/1981 | Japan | 136/232 |

Primary Examiner—Diego F.F. Gutierrez
Attorney, Agent, or Firm—Ryan, Maki, Mann & Hohenfeldt

[57] ABSTRACT

A protective device for a thermocouple for immersion into a molten metal bath to measure the temperature in the bath includes an elongated exterior protective body, which has an axis and is formed of a refractory composition. An interior reinforcing member is contained within the protective body extending along the axis. The reinforcing member may be in the form of a hollow tubular body which is filled with a refractory cement. A hollow tube is located within the body for protectively housing a thermocouple. A thermocouple for measuring temperatures in a molten metal bath is positioned in the hollow tube.

8 Claims, 3 Drawing Sheets

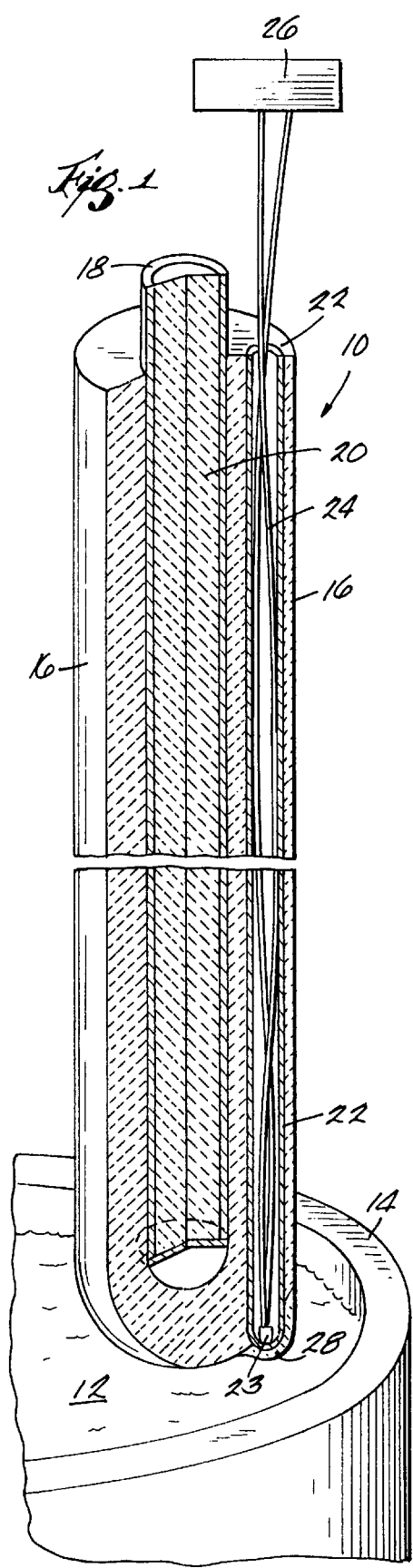
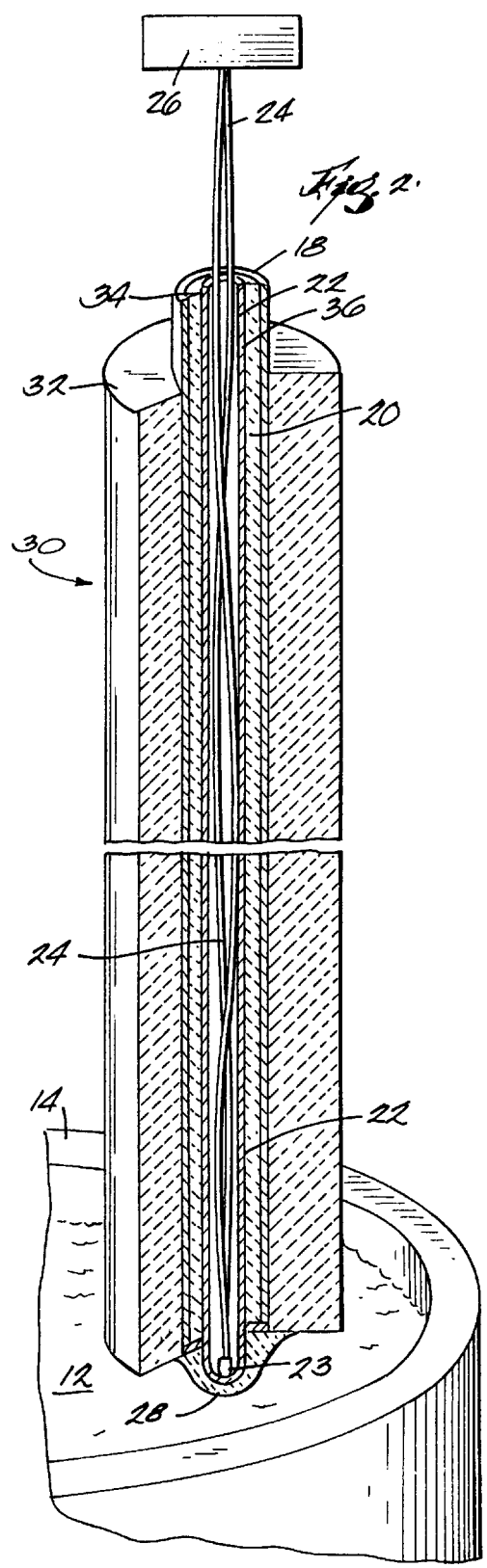

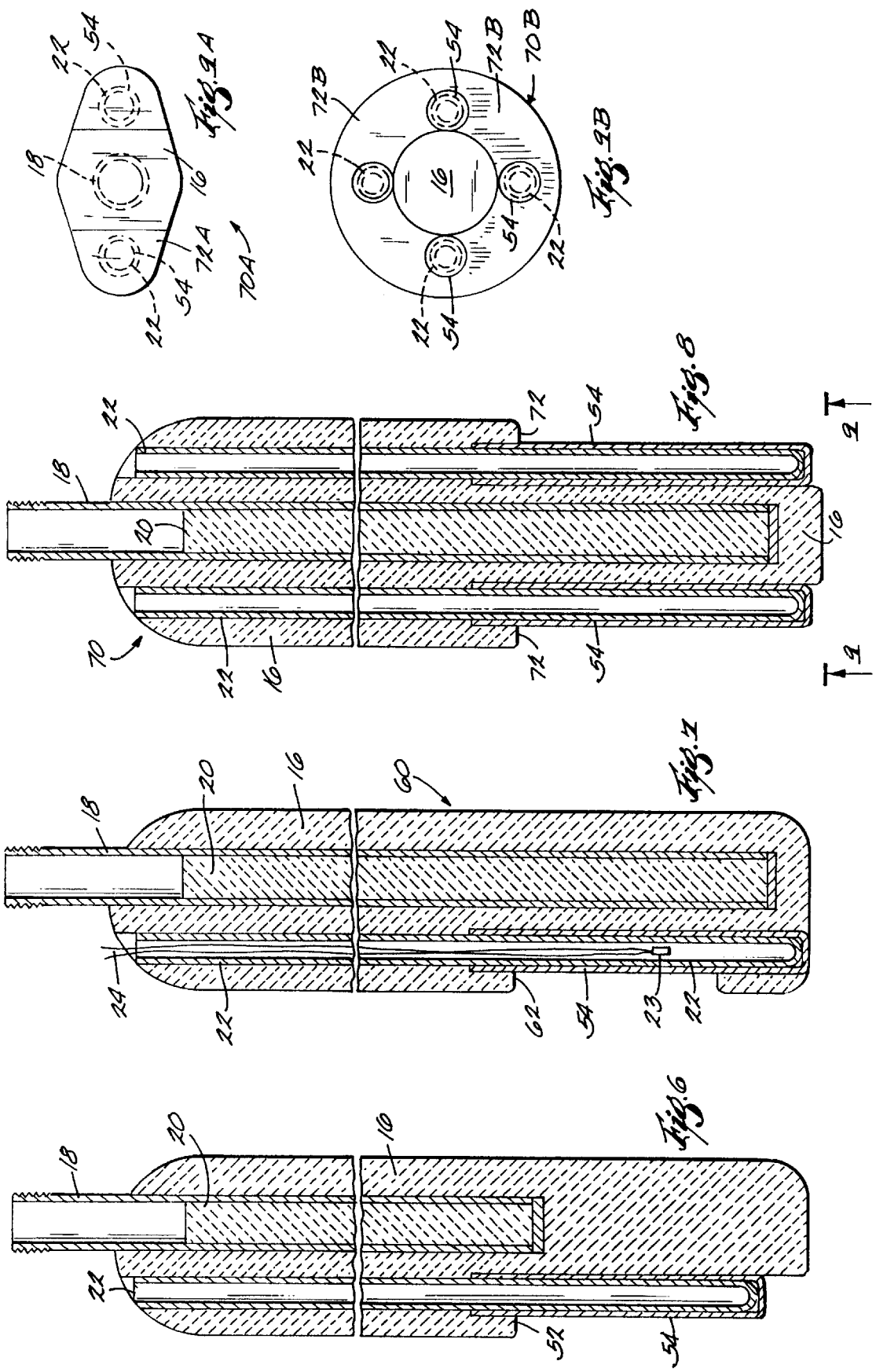

PROTECTIVE TUBE FOR MOLTEN METAL IMMERSIBLE THERMOCOUPLE

FIELD OF THE INVENTION

This invention relates to measurement of temperatures in molten metal baths. More specifically the invention relates to a thermocouple protection tube or protective assembly for encasing a temperature measuring thermocouple particularly adapted for use in aluminum furnaces or similar molten metal-containing environments.

BACKGROUND OF THE INVENTION

Thermocouples or similar temperature measuring devices are conventionally immersed in a molten metal bath in a metal furnace in order to measure the temperature and to control the heat supplied to the furnace. It is desirable that such immersible thermocouple protection tubes have as long a functional life as possible and yet allow the thermocouple to be sensitive to temperature changes in the molten metal that is being controlled. Such furnaces are used, for example, in refining of aluminum, copper, brass or bronze, are typically gas fired. It is also important that thermocouple protection tubes be easy to use and economical.

In some refining operations nitrogen or nitrogen-chlorine mixtures are bubbled through the molten metal in order to degas the metal or remove impurities therefrom. The resultant atmosphere, including the gases, metal and slag is thus hostile and especially corrosive to the process equipment including the thermocouple protection tubes, thus significantly shortening the life of the thermocouple protection tubes.

Currently used thermocouple protection devices for thermocouples include closed end cast iron pipes, which may have a wall thickness as much as one inch thick. Such devices have been found to successfully protect the encased thermocouple for a period varying from approximately 24 hours to 2 weeks at aluminum furnace operating conditions which typically are in the 1300° to 1500° F. range.

Other protective devices have also been developed which extend the life of the thermocouple. However, graphite tubes, for example, while providing excellent temperature response and long life protection, are fragile and very expensive and thus costly to use. Various refractory materials formed of minerals such as alumina carbides boron nitrides or various metallic oxides are expensive to produce and also tend to be excessively brittle.

Due to these considerations, one type of economical, protective tube consists of a commercially available refractory mineral fibrous material held together by a binder or cement, such as colloidal, ammonium-stabilized silica dispersion. The tube forms a protective sleeve over an inner steel pipe within which the thermocouple is positioned. These devices, however, suffer from two problems. First, the devices tend to excessively insulate the thermocouple, which thus provides readings undesirably delayed relative to temperature changes within the furnace. Also, the problem exists, especially in longer devices (2 to 8 feet) when used in hotter melts, that the pipe begins to bend or bow at the high temperatures encountered in a molten metal bath. Moreover, the probes tend to last about 30 days, depending on conditions, because chlorine gas migrates through the protective cover of the device over a period of time, and forms ferrous or ferric chlorides and oxides, thereby eroding the pipe contained within the device.

Thus, a significant need has existed in the metal processing industry for improved thermocouple protective devices which are both inexpensive and yet provide very sensitive and accurate temperature readings over a long life span.

SUMMARY OF THE INVENTION

It is a principal object of the invention to provide an improved protective device for thermocouples intended for immersion in metallic baths such as aluminum, copper or alloys of the same. In accordance with an important aspect of the invention the protective device includes many of the relatively inexpensive features of the prior art refractory fiber coated metallic pipes described above, but wherein a plug of internally reinforcing material such as a castable refractory cement is added. Such reinforcement has been found to significantly prevent bowing or bending of the thermocouple device at elevated temperatures. In accordance with an important advantage of the invention, the thermocouple can be repeatedly removed from and reinserted into a bath for reuse.

In accordance with a related aspect, the invention provides a protective device for thermocouples that is economical, yet provides a long lifespan over repeated usage and is resistant to molten metals and their slags as well as gaseous materials such as chlorine. In accordance with a related aspects, economy is achieved through use of expensive materials, such as quartz, graphite and high-alumina content ceramics, in limited quantities where needed in critical areas for chemical and thermal protection and for sensitivity to extreme temperature changes. The fragile expensive components are limited to physically protected portions of the device.

In accordance with a preferred embodiment of the invention a refractory tube is provided, which, except for the temperature measurement areas is located within the fibrous refractory protective layer. The refractory tube is preferably positioned outside of the reinforcing member by which it is supported and, at least partially, within the fibrous material by which it is protected to provide a tube for housing the thermocouple which provides improved temperature reading sensitivity. In accordance with still further related aspects of the invention the thermocouple located within the protective tube provided by this invention provides a rapid, sensitive, response, thereby providing accurate and timely temperature readings within a molten metal bath.

In accordance with yet further aspects of the invention, a protective assembly is provided wherein a refractory tube for housing a thermocouple is shielded from chemical attack by a thermally conductive corrosive atmosphere-resistant material of reduced thickness, but is supported by a heat resistant, dimensionally stable protective refractory fiber body. In accordance with this aspect, the thermally conductive material covering the exposed temperature sensitive area may be a graphite sleeve or castable graphite coating.

Briefly, the invention provides a protective device for a thermocouple for immersion into a molten metal bath to measure the temperature in the bath includes an elongated exterior protective body, which has an axis and is formed of a refractory composition. An interior reinforcing member is contained within the protective body extending along the axis. The reinforcing member may be in the form of a hollow tubular body which is filled with a refractory cement. A hollow tube is positioned within the body for protectively housing a thermocouple. A thermocouple for measuring temperatures in a molten metal bath is positioned in the hollow tube.

Further aspects and advantages of the invention will be set forth in the following detailed description and claims and with reference to the accompanying drawings.

BRIEF DESCRIPTION OF THE DRAWINGS

FIG. 1 is a fragmentary perspective view with parts in section showing one embodiment of the invention;

FIG. 2 is a fragmentary perspective view with parts of section showing a further embodiment of the invention;

FIG. 6 is a central sectional view showing a protective device in accordance with a further embodiment of the invention;

FIG. 7 is a central sectional view showing a protective device in accordance with a yet further embodiment of the invention;

FIG. 8 is a central sectional view showing a protective device in accordance with a further embodiment of the invention;

FIG. 9A is an end view taken along Line 9—9 of FIG. 8 showing a preferred embodiment; and FIG. 9B is an end view taken along Line 9—9 of FIG. 8 showing an alternate embodiment of the invention.

DETAILED DESCRIPTION OF A PREFERRED EMBODIMENT

Figure 3:
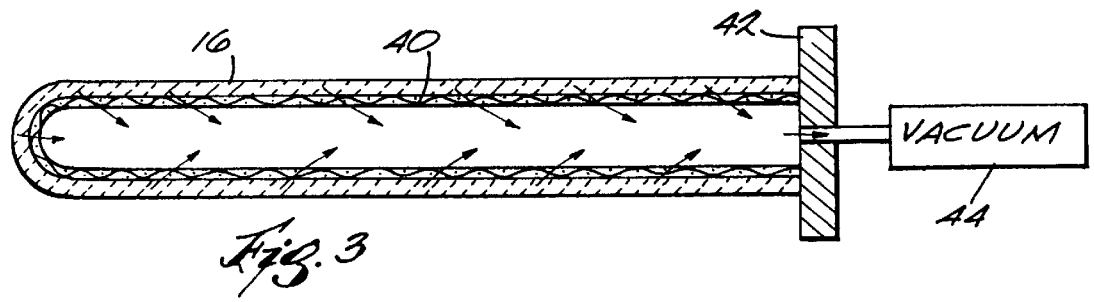
FIG. 3 is a cross sectional partially diagrammatic view showing a step in the process of manufacturing a protective device of the invention.

Referring more specifically to the drawings, there is seen in FIG. 1 an immersible temperature monitoring probe device 10. Probe 10 is adapted for immersion into a molten metal bath such as molten aluminum 12 contained in a suitable vessel 14. In practice, vessel 14 may be a compartment of an aluminum refining furnace.

Probe 10 includes a protective elongated, generally tubular body 16 formed preferably of a fibrous refractory material which includes refractory fibers bound together with a heat resistant binder such as a colloidal ammonium stabilized silica dispersion (commercially available, for example from Nalco Chemical Company under the trade designation Nalco 2327). To provide dimensional stability to the probe, a cylindrical pipe 18, which may be formed of a metal such as steel, is embedded, preferably at the center of protective tubular body 16.

In accordance with the invention, a core of castable refractory cement material or a tubular refractory 20 is provided within reinforcing member 18. The presence of filler 20 has been found, in accordance with the invention, to provide exceptional dimensional stability and resistance to bending at elevated temperatures to the body of probe 10. A second refractory tube 22 preferably formed of quartz or other high temperature, thermal shock and corrosive resistant refractory material is embedded within one side of protective body 16 to provide a channel for containment of thermocouple hot junction 23. As seen in FIG. 1, refractory tube 22 is closed at its lower end. The upper end of refractory tube 22 is open to provide access for refractory insulated thermocouple lead wires 24, which are connected to temperature monitoring means 26. A relatively thin layer 28 of castable refractory material covers the exterior of the bottom end of refractory tube 22 where the hot junction of thermocouple 23 is located.

Referring to FIG. 2 there is seen an alternate embodiment of the invention in the form of alternate protective tube assembly 30. This embodiment of refractory cement-fiber body 32 entirely encases interior pipe 18. The cement-fiber body 32 is formed of refractory fibers imbedded in a refractory cement or binder. Also in this embodiment a tube 34 of smaller diameter than tube 18 is located within the interior thereof. Tube 34 may be formed either of metal, quartz or other temperature resistant material. As seen in FIG. 2 the bottom or distal end of tube 34 should protrude beyond the lower end of tube 18. Alternatively the tube 34 can be entirely located within tube 18. Also in this embodiment a layer 36 of refractory cement material fills the space between the exterior of tube 34 and the interior of tube 18. Thus a resistance to bending similar to that provided by the embodiment of FIG. 1 is achieved. Due to the placement of the tube 34 which contains and protects thermocouple 23, however, the sensitivity to temperature fluctuations is less than that of the following described preferred embodiments. If tube 34 extends outwardly of the protection tube 18, breakage of tube 34 is easily possible.

Figure 4:
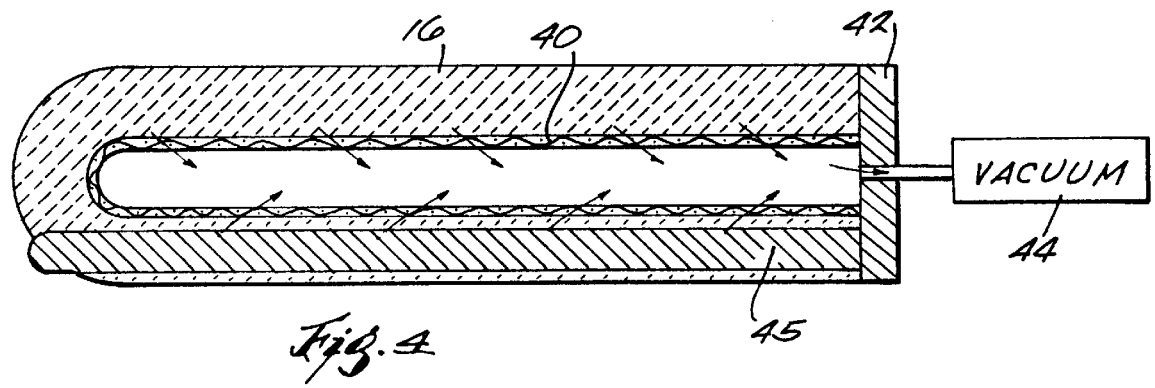
FIG. 4 is a partially diagrammatic sectional view showing a further step in the manufacture of a protective device of this invention.
Figure 5:
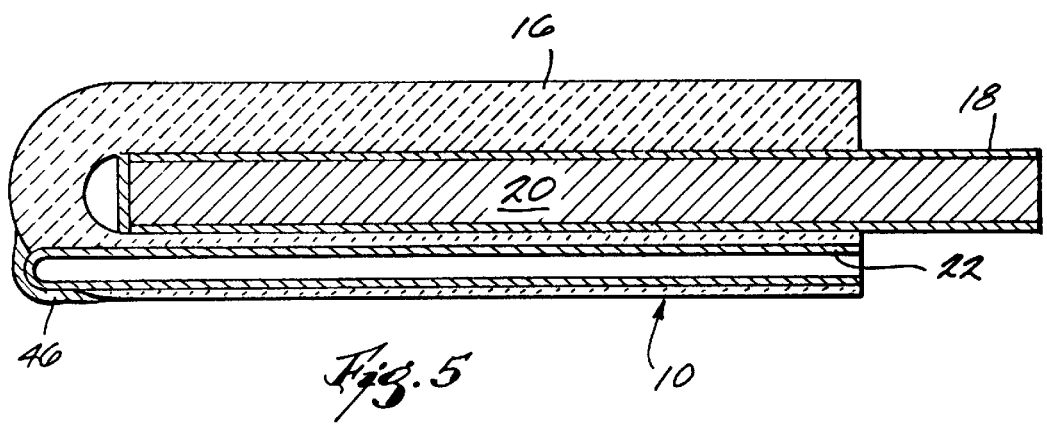
FIG. 5 is a central sectional view showing the final steps in the assembly of a protective device in accordance with the invention.

Referring to FIGS. 3–5 a method of forming the protective bodies of this invention is shown. A slurry of heat resistant mineral fibers and a castable refractory binder material such as a colloidal silica dispersion is provided in a flowable mixture. The mixture is introduced around a hollow screen 40 of desired configuration. Screen 40 is closed at one end by a supporting fixture 42 in which negative pressure is produced by a vacuum pump 44, thereby drawing the slurry onto screen 40.

As seen in FIG. 3 a thin layer 16, approximately ¼ inch (0.6 cm.) of refractory fiber material is first deposited on the screen when the assembly is immersed under vacuum into the flowable mixture. Refractory tube 22 or, more preferably, a mold insert 45 having slightly larger dimensions than tube 22, is then placed over the thus partially formed layer of refractory material 16. The vacuum forming process is continued as seen in FIG. 4 in order to complete the build up of the outer refractory layer 16. If a mold insert 45 is used, it may be removed after hollow screen 40 is removed from the formed part. A pipe 18 may be inserted in the cylindrical opening formed by screen 40 in the formed part, preferably before drying and curing of material 16. Tube 22 is inserted into the cavity formed by insert 45 before or after curing. In order to form a protective refractory shape 16 having optimum properties, it is preferred that the shape be dipped in and saturated with ammonium stabilized colloidal silicate inside and outside slurry after initial drying and curing. Pipe 18 and tube 22 may both be removed from shape 16 during this further dipping process. Pipe 18, filled with refractory material 20 and tube 22 are reinserted after further drying and curing. A thin layer of refractory cement material 46 may be applied over the distal tip and refractory tube 22 as necessary in order to protect this area of the tube against corrosive materials and to fill any gaps between the tube 22 and refractory material 16. Alternatively, refractory tube 22 can either be coated with a graphite layer by dipping in a graphite slurry and/or placed in a graphite or similar protective covering 54 before final insertion into refractory shape 16.

The assembly of this invention is supported by a lance, rod or other conventional supporting means in accordance with known procedures. A thermocouple can be placed inside of refractory tube 22 immediately prior to or after placement of the protective device 10 in service.

Referring to FIGS. 6–9B, various further embodiments of the invention are illustrated. In each of these embodiments a central supporting pipe 18 filled with refractory material 20 is utilized for providing shape stability as discussed above. A generally tubular body of fibrous refractory material 16 is similarly used in the case of each of the alternate embodiments. Generally refractory fiber 16 having a minimum thickness of at least ¼ inch (0.6 cm.) is desirable for protection of reinforcing tube 18 and for insulating tube 22 from heat transfer from the pipe assembly 18.

In the embodiment of FIG. 6 probe protector 50 is imparted with greater protection against breakage and temperature sensitivity by providing a notched out portion 52 of protective fibrous material 16 and spacing tube 22 away from the bottom end of the protective sleeve 16. The closed lower end of refractory tube 22 is covered by means of a thermally conductive protective covering 54 which is preferably formed of graphite. Alternatively, or in combination with covering 54, a graphite layer may be formed by dipping the tube 22 in a slurry of graphite-containing material such as Graphi-Bond 669, available from Aremco Products, Inc. Graphite covering 54 is preferably attached around the end of refractory tube 22 by means of a high temperature graphite adhesive, for example, Graphi-Bond 669, the major constituent of which is finely divided graphite. Tube 22 and protective coating sleeve 54 are cemented and secured to sleeve 16 by refractory or graphite cements such as Ceramabond 669 (Trademark of Aremco Products) to support the fragile refractory tube and furnish added protection against breakage. As shown, the lower or distal end of protective refractory 16 extends beyond the end of refractory tube 22 in order to provide protection against impacts which might break the tube 22.

As also seen in FIG. 6, reinforcing member 18 does not necessarily extend completely to the lower, or distal end of the protection tube. Rather, that portion of the device most subject to bending is reinforced. Shortening of member 18, somewhat, minimizes the "heat sink" effect that may occur when tube 18 is heated after a period of immersion of the device in molten metal, which effect may distort the temperature readings being obtained.

FIG. 7 illustrates a further embodiment of a thermocouple protective tube device 60. As in the case of protective device 50 the refractory tube 22 is partly exposed but covered by a refractory protective cap such as a graphite covering 54. Instead of being fully exposed as in the case of device 50, however, a notch 62 is provided to partly expose the lower end of refractory tube 22, yet protect the tube end against breakage. It will be noted that the hot junction 23 of a thermocouple 24 is preferably located adjacent to notch 62.

FIGS. 8, 9A and 9B illustrate still further embodiments of the invention. In the embodiment of FIGS. 8 and 9A a protective device 70 is provided in which more than one refractory tube 22 is utilized. Each of these refractory tubes is covered with a protective covering 54 as in the earlier described embodiments. By providing two or more tubes 22 the life of the device 70 can be extended. IE, in the event that one of the tubes 22 is shattered for example by impact or otherwise it is still possible to use the device 70 by inserting a thermocouple into the alternate tube 22. As in the case of the earlier embodiments the protective 16 is cut away at portion 72 (or 72A as seen in FIG. 9A) in order to expose the lower end of protective refractory tube 22 thus improving the thermal conductivity and hence sensitivity of the device.

In the still further embodiment shown in FIG. 9B the protective body 16 encloses four protective tubes 22 protected by covers 54 at their lower ends.

The configurations illustrated in FIGS. 6–9B are found to provide a protective device of superior characteristics highly resistant to bending and to the hot and corrosive surroundings in a molten metal bath and yet provide a high sensitivity to temperature readings while protecting the fragile refractory tubes 22 contained within the assemblies.

While reinforcing member 18/20 has been described as a metal pipe filled with a refractory material, other reinforcing members can be substituted. For example, solid metal or ceramic rods can be used. Also, tubes formed from materials such as ceramics, high temperature resistant composites, etc., filled with refractory material 20, can be substituted.

As the term "refractory" is used herein, any high temperature resistant material know to the art is intended to be included. Examples include graphite, quartz, boron nitride, alumina, alumina graphite and similar materials known to those skilled in the art.

Since various thermocouples, such as chromel-alumel, etc. are well known to those familiar with the art, specific details thereof will not be described herein. Thus, the term "thermocouple" as used herein is intended to encompass any suitable temperature measuring device suitable for measuring temperatures of molten metal baths such as molten aluminum.

In addition to the foregoing preferred embodiments, various other modifications falling within the scope and spirit of the invention and true scope of the appended claims will be apparent to those skilled in the art.

I claim:

1. In combination, a protective device and a thermocouple protected thereby for immersion into a molten metal bath to measure the temperature in said bath comprising:
    an elongated exterior protective body, said body having an axis and being formed of a refractory composition,
    an interior reinforcing member resistant to bending being contained within said protective body and extending along said axis, said reinforcing member including a bend resistant tube filled with refractory cement, said reinforcing member extending alone a majority of the length of said protective body,
    at least one hollow refractory tube positioned within said body for protectively housing said thermocouple, a portion of said tube protruding through a wall of said protective body, said portion being coated with a refractory material,
    said thermocouple for measuring temperatures in a molten metal bath being positioned in said hollow tube.

2. A device according to claim 1 wherein said bend resistant tube comprises a hollow steel pipe.

3. A protective device according to claim 1 wherein said hollow refractory tube is formed of quartz.

4. A protective tubular device according to claim 1 wherein said hollow refractory tube has a closed end adapted for immersion into a molten metal bath.

5. A device according to claim 1 comprising at least two of said hollow refractory tubes.

6. A protective tubular device for a thermocouple for immersion into a molten metal bath having a distal end for immersion into said bath and a proximal end adapted to be supported out of said bath, comprising,
    an elongated exterior protective body having an axis and being formed of a refractory composition including refractory fibers embedded in a refractory cement or binder,
    an interior reinforcing member extending substantially along the length of the central axis of said elongated protective body, said reinforcing member imparting a resistance to bending or bowing of said device when immersed in molten metal, said reinforcing member including a bend resistant tube filled with refractory cement, at least one hollow refractory tube closed at its distal end and having an open proximal end, said refractory tube being positioned within said exterior protective body parallel and exterior to said reinforcing member, portion of said tube protruding through a wall of said protective body, said protruding portion being coated with a refractory material, said hollow refractory tube being adapted to receive a thermocouple for measuring temperatures in a molten metal bath.

7. A device according to claim 6 wherein said refractory material comprises a layer or cap comprising graphite.

8. A device according to claim 6 comprising a plurality of refractory tubes.

\* \* \* \* \*